Figure 1:
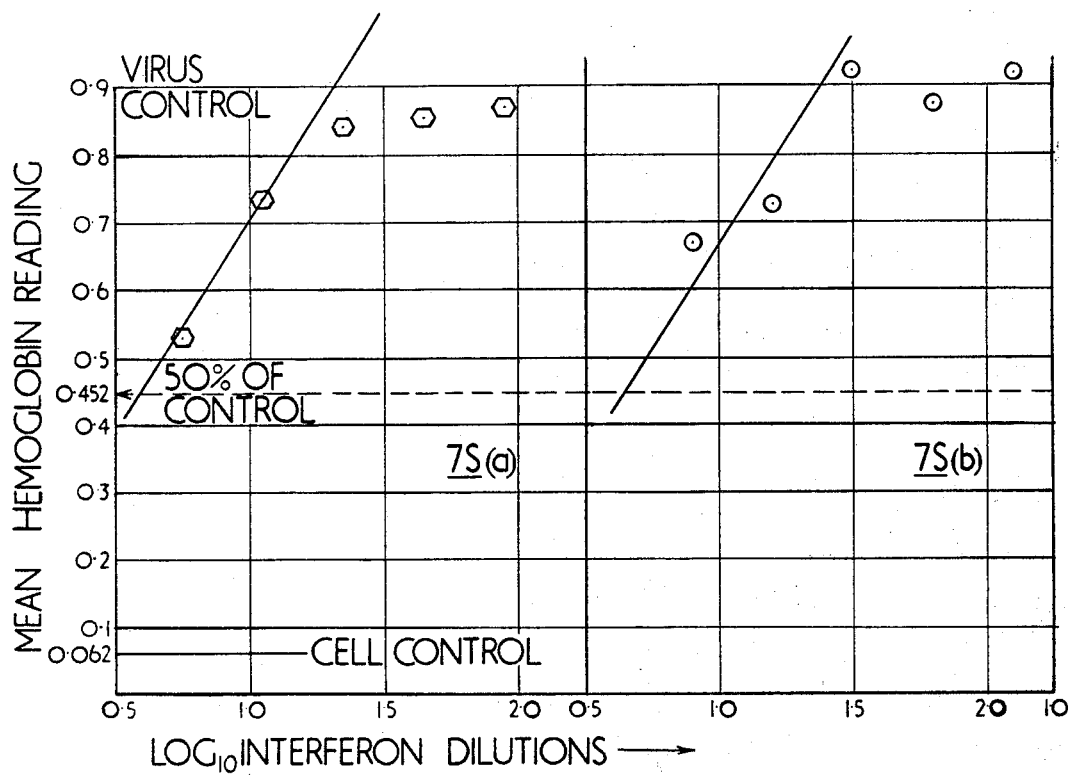

3,385,757
QUANTITATIVE HEMADSORPTION ASSAY
TECHNIQUE FOR THE ESTIMATION OF
INTERFERON
Norman Boyne Finter, Macclesfield, England, assignor to
Imperial Chemical Industries Limited, London, England, a corporation of Great Britain
Filed Nov. 14, 1963, Ser. No. 323,712
Claims priority, application Great Britain, Nov. 23, 1962,
44,354/62
16 Claims. (Cl. 167—84.5)

This invention relates to a new assay technique and more particularly it relates to a new assay technique for the estimation of interferon by hemadsorption.

An antiviral agent known as interferon, which may be recognized by its ability to inhibit viral growth, is produced by the interaction of virulent or avirulent viruses and living cells.

Mammalian cells such as calf kidney cells in tissue culture, generally used in the form of a cell sheet, can be infected with the Sendai strain of influenza virus. When the virus grows in these cells, it alters the surfaces of the said cells so that they acquire the property of binding or adsorbing red blood cells to themselves. Thus when a suspension of guinea pig blood cells is added to infected calf kidney cells, the red blood cells bind themselves to those calf kidney cells having altered surfaces and this phenomenon is known as hemadsorption. The relative amount of virus growth which has taken place in the infected cells can be estimated by determining the amount of hemadsorption. After treating the said infected cells with guinea pig blood cells and allowing hemadsorption to take place, the tubes containing the infected cells can be viewed through a miscroscope and the relative numbers of red blood cells bound to the surface of the infected cells can be estimated approximately. The percentage of the infected cell sheet which has red blood cells bound to its surface gives some indication of the extent of virus growth.

If the growth of virus in the calf kidney cells is prevented by any means, for example as the result of first treating the said cells with interferon, the amount of hemadsorption will be correspondingly reduced. When a series of tubes is treated with different concentrations of an interferon preparation and then infected with a virus, the average amount of hemadsorption can be estimated and compared with the amount of hemadsorption in a comparable series of control tubes likewise containing infected cells but excluding any treatment with interferon. When the results so obtained are reproduced on a graph by plotting the amount of hemadsorption against the dilution of interferon (expressed in logarithmic units), the curve obtained is a linear one within a certain range of interferon dilutions. Thus the particular dilution of interferon leading to a 50% reduction of hemadsorption can be determined and by comparison with the results obtained in parallel with a standard reference preparation of interferon, the relative potency of the interferon preparation can be assessed. The disadvantages of this assay technique are (i) it is tedious in operation since it involves microscopic examination of each tissue culture tube and (ii) it is not highly accurate since subjective estimation of the amount of hemadsorption is involved.

I have now found that a much more accurate and less tedious estimate of the number of red blood cells bound to the surfaces of the infected calf kidney cells can be obtained by determining the amount of hemoglobin contained in the red blood cells bound to the infected cells. It is to be understood that in contact with air and in the absence of chemical reducing agents, hemoglobin exists in the form of oxyhemoglobin and this is the form of hemoglobin referred to throughout the specification unless otherwise stated. I have found, and herein lies the basis of my invention, that when a tube containing infected calf kidney cells with red blood cells hemadsorbed on to it is first washed to remove any free red blood cells, the hemoglobin contained within the hemadsorbed red cells can be liberated into solution. This is conveniently achieved by adding an aqueous medium for example distilled water to the tube which breaks the membranes of the red cells and liberates the hemoglobin contained within them. The hemoglobin-containing fluid can be decanted from the tube and the amount of hemoglobin can be estimated accurately for example by means of a spectrophotometer and measurement of the amount of ultraviolet light adsorbed by the hemoglobin at 4100 A. This improved assay technique is an accurate and reproducible analytical procedure for the estimation of interferon and as such it can be applied as a method of control during the manufacture of interferon.

Thus according to my invention I provide an assay process for the estimation of interferon which comprises adding the said interferon to living cells and then adding a suitable hemadsorbing virus and after a period of incubation adding a suspension of red blood cells and thereafter estimating the amount of hemadsorption that has taken place by means of a colorimetric or a chemical procedure.

The living cells used as the substrate in this assay method are conveniently in the form of a tissue culture, generally in the form of a cell sheet, and any tissue culture system in which a hemadsorbing virus will grow can be used in the present process. The living cells may be for example mammalian cells such as calf kidney, rabbit kidney or monkey kidney cells, or human cell strains of the type described by Hayflick and Moorhead (Experimental Cell Research, 1961, volume 25, page 585) or they may be avian cells such as chick embryo kidney cells.

The cells are treated with dilutions of the interferon preparations to be tested for periods of 18–24 hours at 37° C. before adding the hemadsorbing virus. A suitable hemadsorbing virus may be for example a myxovirus such as influenza A, influenza B, Para-influenza 1, Para-influenza 2 or Para-influenza 3 or any other hemadsorbing virus for example viruses of the arthropod-borne group such as Semiliki Forest virus. A particularly useful hemadsorbing virus is the Sendai strain of Para-influenza 1 virus. The period of incubation, during which the virus grows in the presence of the interferon, generally lasts for about 24 hours and may be carried out at a temperature of 36–39° C., the particular temperature being determined for each tissue culture and virus system.

The suspension of red blood cells to be added to the tissue culture tube containing infected cells may be of mammalian or avian origin and suitable red blood cells may be for example guinea pig, chicken, goose, or monkey blood cells. The suspension is prepared of suitable concentrations for example 0.4% v./v. of guinea pig cells in a saline medium with a suitable concentration of calcium and magnesium ions to promote rapid hemadsorption. The time of adsorption and the temperature during adsorption are of importance and it is preferable that the red cell suspension is at a temperature of 17–37° C. and is left in contact with the virus-treated tissue culture cells for at least 10 minutes to ensure adequate hemadsorption.

After hemadsorption has taken place, the cell sheet containing adsorbed red blood cells is washed carefully to remove any unadsorbed red cells which might lead to an incorrect assay. This washing procedure is generally carried out by use of a saline medium preferably one containing no calcium or magnesium ions in order to minimise possible enlymic elution of adsorbed red cells from the cell surface.

When the washing operation to remove unadsorbed red cells is complete, the hemoglobin is liberated from the adsorbed red blood cells by addition of an aqueous medium for example distilled water or aqueous sodium hydroxide or aqueous alkaline sodium cyanide, thereby providing a solution of hemoglobin, or a convenient derivative thereof, which can be estimated according to standard methods.

The hemoglobin is conveniently estimated by means of a spectrophotometric technique for example by measurement of the amount of ultra-violet light adsorbed on a spectrophotometer at 4100 A. The hemoglobin may also be estimated by other means for example in the form of a hemoglobin derivative. Thus for example the hemoglobin may be reacted with alkaline potassium ferricyanide to produce methemoglobin, it may be reacted with alkaline pyridine to produce pyridine hemochromagen or it may be reacted with an alkaline cyanide to produce cyanhemoglobin and these particular derivatives may be estimated according to known methods. It may also be estimated in the reduced form as hemoglobin itself, obtained from oxyhemoglobin by reduction with sodium dithionate, and the hemoglobin estimated spectrophotometrically. It may also be estimated in the form of carboxyhemoglobin, by reacting hemoglobin or oxyhemoglobin with carbon monoxide, and the carboxyhemoglobin so formed estimated photometrically.

Preliminary experiments using this new assay technique have shown that the mean amount of hemoglobin liberated from the surface of infected calf kidney cells previously treated with interferon is proportional over a considerable range to the interferon concentration expressed in logarithmic units.

The invention is illustrated but not limited by the following example which gives details of the assay of calf kidney interferon using the Sendai strain of Para-influenza 1 as the challenge virus.

EXAMPLE

Preparation of cell sheets

A calf kidney was treated wtih trypsin according to established tissue culture techniques to give a suspension of cells. This suspension was centrifuged, and the packed cells were washed free from trypsin and were resuspended in a growth medium consisting of Hank's saline with 8% calf serum, 0.5% lactalbumin hydrolysate and 0.05% sodium bicarbonate, with 250 units of penicillin and 50 units of streptomycin added per ml. The number of clumps of two or more cells (viable cell aggregates) in the suspension were counted in a hemocytometer. The suspension was diluted in the growth medium to give 75,000 viable cell aggregates per ml. 1 ml. amounts of the suspension were dispensed into 4" x ½" test tubes (rimless) which were closed with rubber stoppers. 100 ml. amounts of the same suspension diluted to contain 37,500 viable cell aggregates per ml. were dispensed into 1 liter Roux bottles. The cultures were incubated at 37° C. The growth medium of the tubes was replaced with fresh medium after 72 hours, at which time the tubes were placed in roller drums. At the same time additional sodium bicarbonate was added to the Roux bottles to control the pH of these cultures. Confluent sheets of cells (monolayers) were formed in 5–6 days.

The interferon was produced in calf kidney tissue cultures. The growth medium was removed from the Roux bottle cultures. The cells were washed with saline solution, and inoculated with 70 ml. of medium 199 with influenza A virus (Kunz strain) added to give a final concentration of 0.1 hemagglutinating units per ml. of tissue culture fluid. The cultures were incubated for 48 hours at 37° C. The fluid was withdrawn and centrifuged at 3000×$g$ for 10 minutes to remove debris. The fluid was brought to pH 2 by the addition of N/1 hydrochloric acid in distilled water, kept at 4° C. at this pH for 60 minutes, and then brought back to pH 7 by the addition of N/1 sodium hydroxide in distilled water. In this way the influenza virus was inactivated, but the interferon which had been liberated from the virus-infected cells into the tissue culture fluid was not inactivated. Fluid from tissue cultures not inoculated with influenza virus was treated in the same way to serve as a control in the assays.

Estimation of interferon by hemoglobin assay

In the assay to be described, test tube cultures of calf kidney cells containing well grown sheets of cells were drained of their fluid medium. Two-fold dilutions (0.3 $\log_{10}$ steps) of two calf kidney interferon preparations (code letters X1 and X2) and of a standard calf kidney interferon preparation (code letters 7S) were prepared in medium 199 with 0.5% lactalbumin hydrolysate, 0.088% sodium bicarbonate and 1% chick embryo extract. 2 sets of dilutions, (a) and (b), were prepared for each preparation differing by a factor of 1.41 times (0.15 $\log_{10}$ units). 1 ml. amounts of each dilution were added to groups of 9 calf kidney tubes and these were replaced on the roller drums at 37° C. On the following day, 0.1 ml. of Sendai virus in the form of infected allantoic fluid was added to each tube at a dilution corresponding to the addition of 6.2 $\log_{10}$ 50% egg infecting doses (EID 50) per tube. After incubation for a further 24 hours on the roller drum, the tubes were arranged in random order in racks, drained and 2 ml. of a 0.4% (v./v.) suspension of washed guinea pig red blood cells, made up in Dulbecco's phosphate buffered saline at room temperature, were added to each tube and left in contact with the cell sheet. After 5 minutes the tubes were gently rocked, and after 10 minutes they were drained and washed with 2 ml. of Dulbecco's phosphate buffered saline without calcium or magnesium ions, this solution being at 4° C. The hemadsorbed red cells were lysed by the addition of 2 ml. distilled water. This was left in contact with the cell sheet for 10 minutes to allow complete hemolysis to take place. Since the resulting hemoglobin solutions were often denser at the bottom of the tubes, the racks of tubes were placed in a water bath at 37° C. for 5 minutes to promote mixing by convection. The solutions were then decanted for reading. Fluids from 3 comparable tubes were pooled to give 6 ml. of hemoglobin solution. This provided a large enough volume of sufficiently concentrated solution, and also averaged out any variations in the responses of individual tubes. The hemoglobin contents of the solution were read in a Unicam SP 600 spectrophotometer at a wavelength of 4100 A. using a 2 cm. light path cell.

Figure 2:
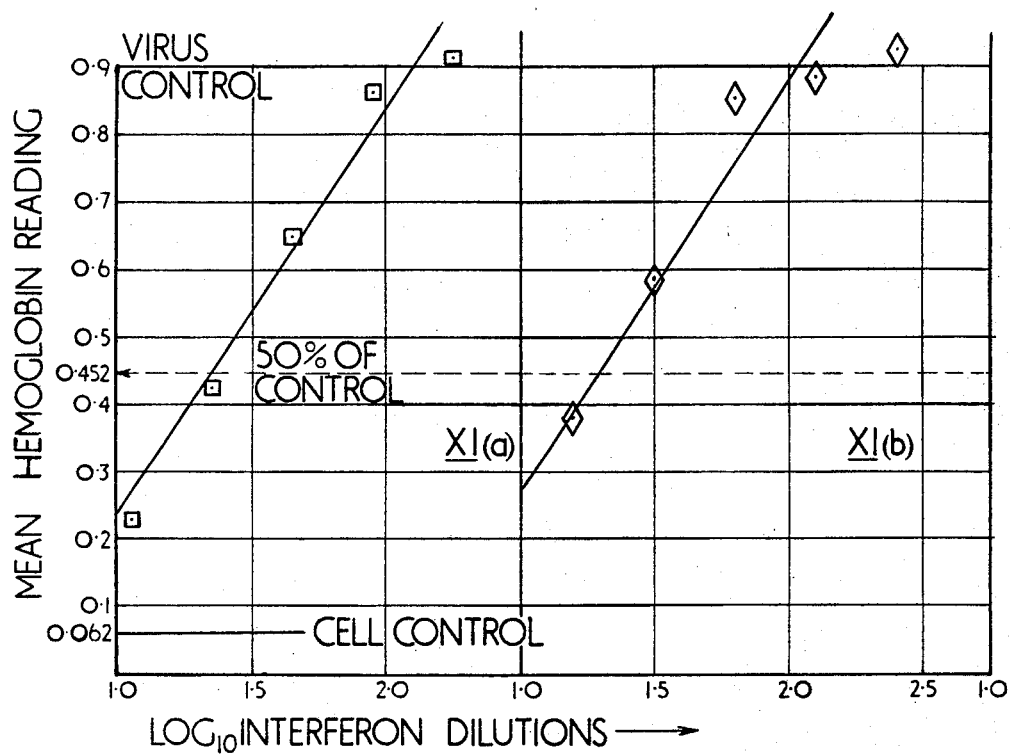
Figure 3:
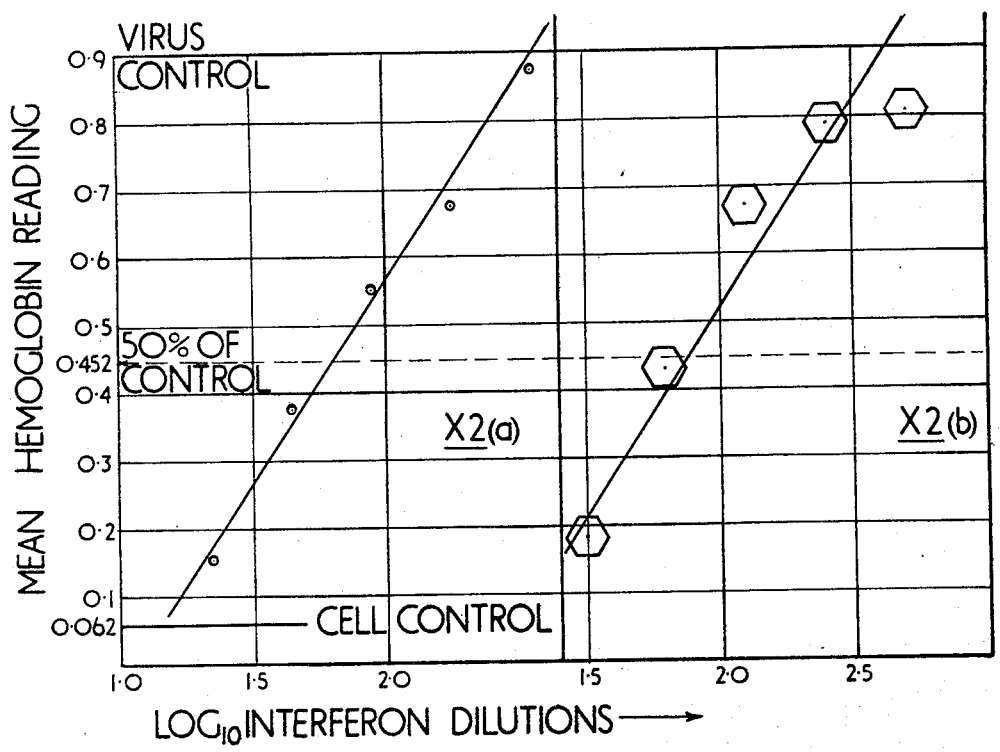

Appropriate controls were included in the test, namely (a) virus controls which were tubes treated with interferon diluent instead of interferon dilutions and inoculated with the same concentration of virus (similar tubes were also treated with 10 times more and 10 times less virus) and (b) cell controls which were tubes treated with the highest concentration of interferon used in the test but not inoculated with virus (control for nonspecific absorption of red cells). These are known as "virus control" and "cell control" in the drawings marked as FIGS. 1, 2 and 3.

The results of this assay are shown in the following Table I:

TABLE I

| | Log₁₀ Dilution | | | | |
|---|---|---|---|---|---|
| | −0.75 | −1.05 | −1.35 | −1.65 | −1.95 |
| Preparation 7S: | | | | | |
| Hemoglobin readings (a) | 0.550 | 0.770 | 0.940 | 0.725 | 0.930 |
| | 0.475 | 0.700 | 0.725 | 0.970 | 0.855 |
| | 0.565 | 0.740 | 0.865 | 0.870 | 0.815 |
| Mean | 0.530 | 0.737 | 0.843 | 0.855 | 0.867 |

| | Log₁₀ Dilution | | | | |
|---|---|---|---|---|---|
| | −0.9 | −1.2 | −1.5 | −1.8 | −2.1 |
| Hemoglobin readings (b) | 0.675 | 0.630 | 0.990 | 0.790 | 1.050 |
| | 0.735 | 0.822 | 0.940 | 0.960 | 0.820 |
| | 0.590 | 0.724 | 0.840 | 0.880 | 0.890 |
| Mean | 0.667 | 0.725 | 0.923 | 0.877 | 0.920 |

| | Log₁₀ Dilution | | | | |
|---|---|---|---|---|---|
| | −1.05 | −1.35 | −1.65 | −1.95 | −2.25 |
| Preparation X1: | | | | | |
| Hemoglobin readings (a) | 0.231 | 0.421 | 0.625 | 0.990 | 0.970 |
| | 0.210 | 0.444 | 0.740 | 0.760 | 0.925 |
| | 0.239 | 0.410 | 0.580 | 0.840 | 0.850 |
| Mean | 0.227 | 0.425 | 0.648 | 0.863 | 0.915 |

| | Log₁₀ Dilution | | | | |
|---|---|---|---|---|---|
| | −1.2 | −1.5 | −1.8 | −2.1 | −2.4 |
| Hemoglobin readings (b) | 0.469 | 0.580 | 0.820 | 0.760 | 0.925 |
| | 0.292 | 0.612 | 0.940 | 0.895 | 1.045 |
| | 0.385 | 0.558 | 0.805 | 1.000 | 0.905 |
| Mean | 0.382 | 0.583 | 0.855 | 0.885 | 0.958 |

| | Log₁₀ Dilution | | | | |
|---|---|---|---|---|---|
| | −1.35 | −1.65 | −1.95 | −2.25 | −2.55 |
| Preparation X2: | | | | | |
| Hemoglobin readings (a) | 0.131 | 0.314 | 0.485 | 0.595 | 0.860 |
| | 0.177 | 0.394 | 0.625 | 0.815 | 0.895 |
| | 0.151 | 0.428 | 0.540 | 0.620 | 0.880 |
| Mean | 0.153 | 0.379 | 0.550 | 0.677 | 0.878 |

| | Log₁₀ Dilution | | | | |
|---|---|---|---|---|---|
| | −1.5 | −1.8 | −2.1 | −2.4 | −2.7 |
| Hemoglobin readings (b) | 0.130 | 0.475 | 0.670 | 0.750 | 0.915 |
| | 0.265 | 0.476 | 0.740 | 0.745 | 0.855 |
| | 0.149 | 0.350 | 0.620 | 0.900 | 0.650 |
| Mean | 0.181 | 0.434 | 0.677 | 0.798 | 0.808 |

In the above Table I, the three readings for the amounts of hemoglobin (in terms of adsorption of ultra-violet light) obtained for each dilution of each interferon preparation are listed under the corresponding dilution. The mean amount of hemoglobin obtained with each dilution is also shown. These mean amounts can be plotted against the logarithm (base 10) of the corresponding interferon dilutions, as in FIGURES 1, 2 and 3. The results for each preparation fall on a line which is linear to a level which is about 90% of the amount of hemoglobin obtained in the virus control tubes treated with the same amount of virus. In other experiments with these same preparations and with other preparations, it has been found that the full dose-response curve for an interferon preparation is linear over an intermediate range of interferon doses, with deviations from the linear at relatively high and at relatively low interferon doses, so that the full curve is S-shaped. Lines can be fitted to the experimental points by standard mathematical techniques and their slope determined. The slopes for the lines in the experiment described above expressed as increase in hemoglobin reading per 0.3 log₁₀ unit increase in interferon dilution are shown in Table II below:

TABLE II

| | Initial Dilution (log₁₀) | Slope |
|---|---|---|
| Preparation: | | |
| 7S(a) | −0.75 | 156.7 |
| 7S(b) | −0.9 | 128.3 |
| X1(a) | −1.05 | 181.5 |
| X1(b) | −1.2 | 145.4 |
| X2(a) | −1.35 | 174.9 |
| X2(b) | −1.5 | 161.5 |
| Pooled estimate of slope=163.7 | | |

It can be calculated that these slopes do not differ significantly from one another, so that a common slope can be used and this has been proved in other similar experiments. The straight portion of the dose-response lines in FIGURES 1, 2 and 3 have therefore been drawn parallel. The results of the assays are obtained from the log₁₀ dilution of the interferon preparations at which the spectrophotometric reading for the amount of hemoglobin is 50% of that in virus control tubes. Thus in this test, the virus control tubes gave a mean reading of 0.905, so that the dilutions of the interferon preparations at which the spectrophotometric readings were half this value, i.e. 0.452, are determined from the graph. These readings give the 50% hemoglobin reduction titers of the interferon preparations. The results are shown in Table III below for the experiment described.

TABLE III

| | Initial Dilution (log₁₀) | Titer—50% Hemoglobin Reduction (log₁₀) | Standardised Titer (7S=100) |
|---|---|---|---|
| Preparation: | | | |
| 7S(a) | −0.75 | −0.6 } −0.63 | |
| 7S(b) | −0.9 | −0.66 | 100 |
| X1(a) | −1.05 | −1.36 | 547 |
| X1(b) | −1.2 | −1.3 | 468 |
| X2(a) | −1.35 | −1.81 | 1,514 |
| X2(b) | −1.5 | −1.87 | 1,738 |

It will be noted that closely similar titers were obtained in the two independent titrations of each of the three preparations. The results have also been calculated mathematically from the regression curves and these results are shown in Table IV below together with the standard errors of each estimation.

TABLE IV

| | Initial Dilution (log₁₀) | Titer—50% hemoglobin reduction (log₁₀) | Standard Error | Standardized Titer (7S=100) |
|---|---|---|---|---|
| Preparation: | | | | |
| 7S(a) | −0.75 | −0.59 } −0.6 | 0.052 } | 100 |
| 7S(b) | −0.9 | −0.62 | 0.54 | |
| X1(a) | −1.05 | −1.35 | 0.039 | 562 |
| X1(b) | −1.2 | −1.29 | 0.043 | 490 |
| X2(a) | −1.35 | −1.81 | 0.038 | 1,620 |
| X2(b) | −1.5 | −1.87 | 0.038 | 1,860 |

It has been found from a number of comparable experiments that the relative titers of interferon preparations as obtained according to the present assay technique do not differ significantly from time to time in different assays. The absolute titer (in terms of the dilution at which a given preparation produces 50% reduction in the hemoglobin reading) can however vary over a range of as much as fourfold or more. It is therefore necessary to include a standard preparation in each set of assays and to relate the values obtained with unknown preparations in such assays to those of the standard preparation titrated in parallel. Such a standard preparation can be made as described above for the preparation of calf kidney interferon and conveniently stored in small quantities frozen at −20° C., under which conditions its activity is stable. The results for the two preparations X1 and X2, in terms of the standard preparation 7S taken as 100 arbitrary units, are shown in the final column of Tables III and IV.

What I claim is:

1. An interferon assay comprising the following sequence and combination of steps:
   (a) forming a tissue culture system of living cells in which a hemadsorbing virus will grow;
   (b) treating the cells with dilutions of the interferon preparations to be tested;
   (c) adding a hemadsorbing virus;
   (d) maintaining a period of incubation, during which the hemadsorbing virus grows in the presence of the interferon generally lasting for about 24 hours at a temperature of 36 to 39° C.;
   (e) adding a suspension of red blood cells to the hemadsorbing virus-infected tissue culture cells, and maintaining them in contact for at least long enough to insure adequate hemadsorption;
   (f) washing the cell sheet containing adsorbed red blood cells, after hemadsorption has taken place, with a saline medium in order to remove any unadsorbed red blood cells and minimizing possible enzymic elution of adsorbed red blood cells from the cell surface;
   (g) adding an aqueous medium to the adsorbed red blood cells after completion of the washing operation for removal of unadsorbed red blood cells, thereby liberating the hemoglobin from the adsorbed red blood cells;
   (h) decanting the aqueous solution of hemoglobin which can be estimated by means of spectrophotometric technique according to standard methods.

2. Process as claimed in claim 1 wherein the period of incubation is about 24 hours and is carried out at a temperature of about 36–39° C.

3. Process as claimed in claim 1 wherein the red blood cells are guinea pig, chicken, goose or monkey blood cells.

4. Process as claimed in claim 1 wherein the red blood cells are in the form of a suspension of 0.4% v./v. of guinea pig cells in a saline medium containing calcium and magnesium ions to promote rapid hemadsorption.

5. Process as claimed in claim 1 wherein the red cell suspension is at a temperature of 17–37° C. and is left in contact with the virus-treated tissue culture cells for at least 10 minutes to ensure adequate hemadsorption.

6. Process as claimed in claim 1 wherein the hemoglobin is estimated by means of a spectrophotometric technique.

7. Process as claimed in claim 6 wherein the hemoglobin is estimated by measurement of the amount of ultra-violet light adsorbed on a spectrophotometer at 4100 A.

8. Process as claimed in claim 1 wherein the hemoglobin is estimated in the form of a hemoglobin derivative.

9. Process as claimed in claim 8 wherein the hemoglobin is estimated in the form of methemoglobin, pyridine hemochromagen, cyanhemoglobin or carboxyhemoglobin.

10. An interferon assay comprising the following sequence and combination of steps:
    (a) forming a tissue culture system of living cells in which a hemadsorbing virus will grow;
    (b) treating the cells with dilutions of the interferon preparations to be tested for periods of 18 to 24 hours at 37° C.;
    (c) adding a hemadsorbing virus;
    (d) maintaining a period of incubation, during which the hemadsorbing virus grows in the presence of the interferon generally lasting for about 24 hours at a temperature of 36 to 39° C.;
    (e) adding a suspension of red blood cells and calcium and magnesium ions to the hemadsorbing virus-infected tissue culture cells at a temperature of 17 to 37° C., and maintaining them in contact for at least 10 minutes to ensure adequate hemadsorption;
    (f) washing the cell sheet containing adsorbed red blood cells, after hemadsorption has taken place, with a saline medium containing no calcium or magnesium ions, in order to remove any unadsorbed red blood cells and to minimize possible enzymic elution of adsorbed red blood cells from the cell surface;
    (g) adding an aqueous medium to the adsorbed red blood cells after completion of the washing operation for removal of unadsorbed red blood cells, thereby liberating the hemoglobin from the adsorbed red blood cells;
    (h) decanting the aqueous solution of hemoglobin which can be estimated by means of spectrophotometric technique according to standard methods.

11. An assay process, as claimed in claim 10, wherein the living cells are mammalian cells, human cell strains or avian cells.

12. An assay process, claimed in claim 11, wherein the living cells are calf kidney, rabbit kidney, monkey kidney or chick embryo kidney cells.

13. A process as claimed in claim 10 wherein the hemadsorbing virus is a myxovirus or a virus of the arthropod-borne group.

14. A process as claimed in claim 13 wherein the hemadsorbing virus is influenza A, influenza B, Para-influenza 1, Para-influenza 2, Para-influenza 3 or Semliki Forest virus.

15. Process as claimed in claim 10 wherein the suspension of red blood cells is of mammalian or avian origin.

16. Process as claimed in claim 10 wherein the aqueous medium utilized in step (g) is distilled water, aqueous sodium hydroxide or aqueous alkaline sodium cyanide.

References Cited

UNITED STATES PATENTS

| | | | |
|---|---|---|---|
| 1,974,522 | 9/1934 | Twyman et al. | 88—14 |
| 2,223,143 | 11/1940 | Wendel | 88—14 |

OTHER REFERENCES

Hirst et al.: "A Method for the Titration of Influenza Hemagglutinins and Influenza Antibodies With the Aid of a Photoelectric Densitometer," J. Immunol, 45: 273–283 (1942).

Miller et al.: "Quantitative Aspects of the Red Blood Cell Agglutination Test for Influenza Virus," J. Exper. Med. 79: 185–195 (1944).

Levine et al.: "An Absolute Method for Assay of Virus Hemagglutinins," J. Exper. Med. 98 (6): 521–531, December 1953.

Sagik et al.: "Quantitative Aspects of the Spontaneous Elution of Influenza Virus From Red Cells," J. Exper. Med. 99 (3): 251–260, March 1954.

Vogel et al.: "Adsorption-Hemagglutination Test for Influenza Virus in Monkey Kidney Tissue Culture," Science 126 (3269): 358–359, Aug. 23, 1957.

Isaacs et al.: "Virus Inteference," proceeding Royal Society of London, series B, 147 (927): 258–273, Sept. 12, 1957.

Shelokov et al.: "Hemadsorption (Adsorption-Hemagglutination) Test for Viral Agents in Tissue Culture With Special Reference to Influenza," proc. Soc. Exp. Biol. Med. 97 (4): 802–809, April 1958.

Ginzburg et al.: "A Spectrophotometric Method for the Determination of Hemadsorption: Its Use for the Study of Viral Nutritional Requirements," Virology 9: 671–679 (1959).

Ho: "Interferons," New England J. Med. 266: 1258–1264; 1313–1318; 1367–1371, June 1962.

Finter: "Quantitative Hemadsorption, a New Assay Technique I. Assay of Interferon," Virology 24 (4): 589–597, December 1964.

LEWIS GOTTS, *Primary Examiner.*

ELBERT L. ROBERTS, *Examiner.*

S. K. ROSE, *Assistant Examiner.*